(12) United States Patent
Ganesan et al.

(10) Patent No.: US 10,394,654 B2
(45) Date of Patent: Aug. 27, 2019

(54) METHOD AND APPARATUS FOR HYBRID FIRMWARE BOOT

(71) Applicant: Intel Corporation, Santa Clara, CA (US)

(72) Inventors: Krishna Kumar Ganesan, Beaverton, OR (US); Karunakara Kotary, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 179 days.

(21) Appl. No.: 15/475,941

(22) Filed: Mar. 31, 2017

(65) Prior Publication Data

US 2018/0285126 A1 Oct. 4, 2018

(51) Int. Cl.
| | |
|---|---|
| *G06F 1/24* | (2006.01) |
| *G06F 15/177* | (2006.01) |
| *G06F 11/14* | (2006.01) |
| *G06F 12/02* | (2006.01) |
| *G06F 9/4401* | (2018.01) |
| *G06F 8/654* | (2018.01) |

(52) U.S. Cl.
CPC .......... *G06F 11/1435* (2013.01); *G06F 8/654* (2018.02); *G06F 9/4401* (2013.01); *G06F 9/4403* (2013.01); *G06F 12/0238* (2013.01); *G06F 2212/202* (2013.01)

(58) Field of Classification Search
None
See application file for complete search history.

(56) References Cited

U.S. PATENT DOCUMENTS

| | | | |
|---|---|---|---|
| 6,606,707 B1* | 8/2003 | Hirota | G06F 21/10 713/172 |
| 10,003,467 B1* | 6/2018 | Miller | H04L 9/3268 |
| 2004/0194079 A1* | 9/2004 | Nguyen | G06F 8/65 717/168 |
| 2004/0268116 A1* | 12/2004 | Vasisht | G06F 11/1417 713/100 |
| 2006/0101310 A1* | 5/2006 | Diamant | G06F 21/12 714/38.14 |
| 2008/0033609 A1* | 2/2008 | Razavi | G01M 17/00 701/31.4 |
| 2009/0138694 A1* | 5/2009 | Le | G06F 9/4403 713/2 |
| 2011/0231478 A1* | 9/2011 | Wheeler | G06F 17/30864 709/203 |
| 2014/0109076 A1* | 4/2014 | Boone | G06F 8/65 717/170 |
| 2015/0081829 A1* | 3/2015 | Maity | H04L 41/082 709/212 |
| 2017/0206104 A1* | 7/2017 | Sliwa | G06F 9/45558 |
| 2018/0019919 A1* | 1/2018 | Ponnusamy | H04L 41/0846 |
| 2018/0095698 A1* | 4/2018 | Liao | G06F 3/0604 |

* cited by examiner

*Primary Examiner* — Nitin C Patel
(74) *Attorney, Agent, or Firm* — Schwegman Lundberg & Woessner, P.A.

(57) ABSTRACT

A computer boot apparatus and related method use a primary boot component (PBC) that is fixedly mounted in the computer. The PBC has a firmware element that is a non-volatile memory comprising a boot critical portion with instructions that initiate a boot of the computer. The PBC also has a policy manager and a version identifier. The PBC initializes the computer boot via the boot critical portion. The policy manager verifies and authenticates a secondary boot component that is removably attached to the computer.

21 Claims, 5 Drawing Sheets

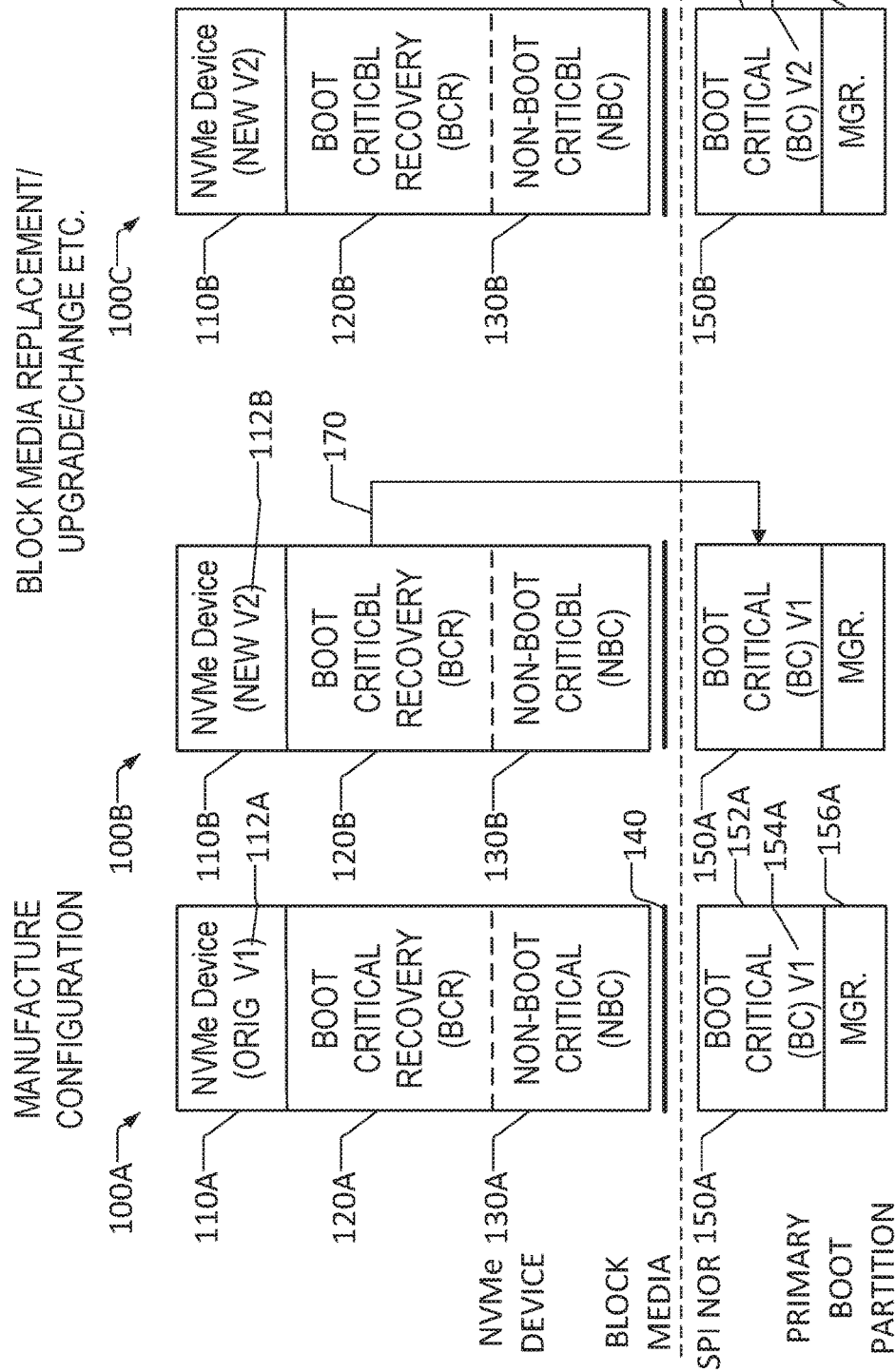

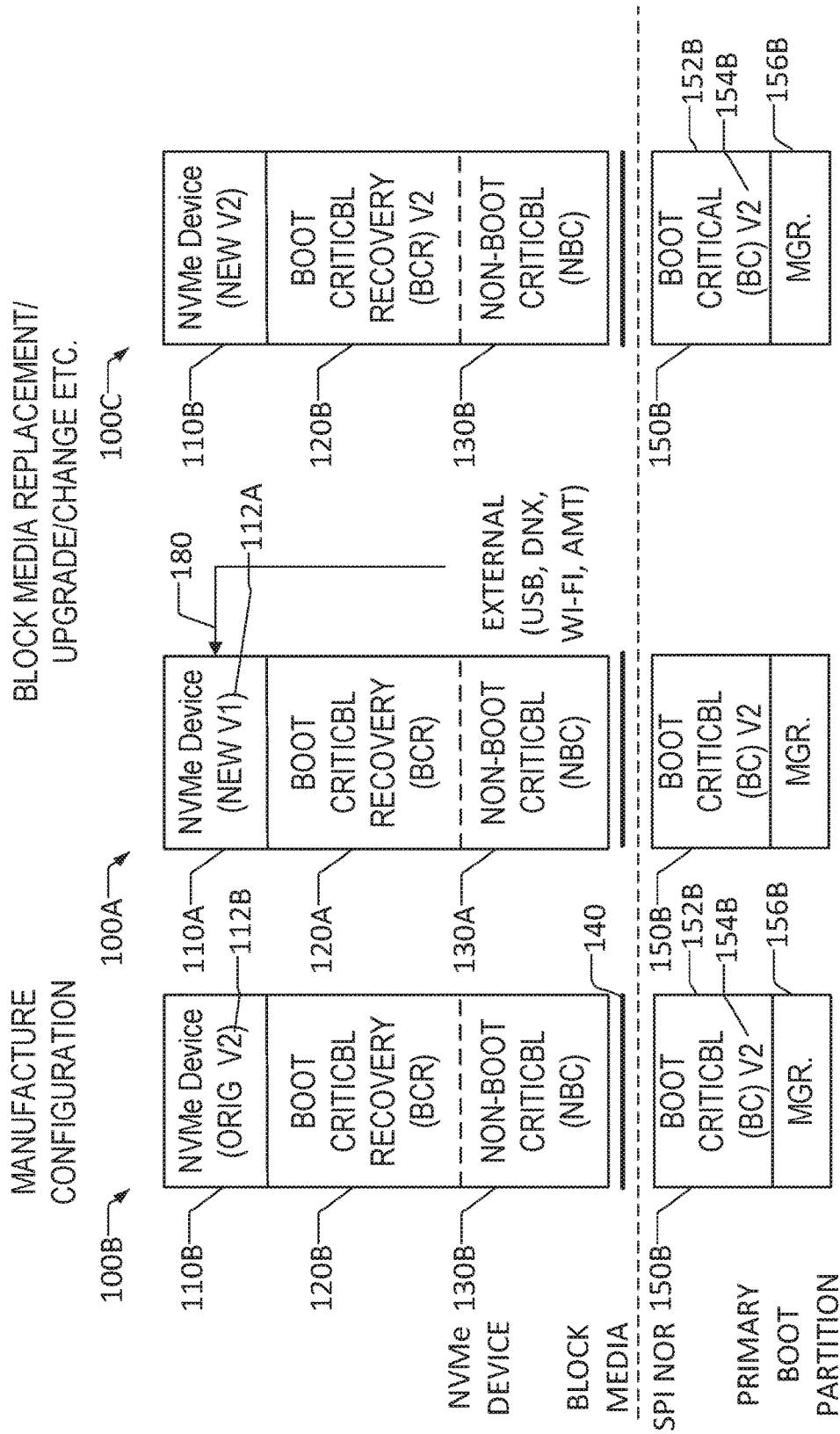

METHOD AND APPARATUS FOR HYBRID FIRMWARE BOOT

The present disclosure relates to boot hardware and related procedures for computers such as personal computers (PCs) and for the provision of a hybrid firmware boot.

BACKGROUND

The boot procedure for a computer is typically executed by code stored partially in a firmware element and partially in block media. Historically, firmware was implemented in read-only memory (ROM), although modern devices typically implement firmware in flash memory, which retains its memory even when power is not applied. Non-volatile Memory Express (NVM Express or NVMe) is a logical device interface specification allowing access to non-volatile storage media attached via a Peripheral Component Interconnect Express (PCI Express or PCIe) bus. The PCIe bus is a high-speed serial computer expansion bus standard that is utilized in many modern PCs. The non-volatile storage media may be flash memory and may be used as solid-state drives (SSDs) for computers.

NVMe NAND technology and NVMe 3D XPoint Block technology media (both being technologies for non-volatile memory) may be designed to support system firmware (FW) specific partitions called "boot partitions" and a secure firmware specific data partition called Replay Protected Memory Block (RPMB). A boot partition is a primary partition containing a piece of software responsible for booting an operating system (OS) (boot loader). An RPMB permits a secure memory block for storing small amounts of secure information, enabling a secure relationship between a host controller and the memory device.

The Serial Peripheral Interface (SPI) is a synchronous serial communications interface typically utilized for short distance communications, and developed by Motorola in the last 1980s. SPI NOR (or Serial NOR) is a type of SPI storage that utilizes non-volatile memory.

BRIEF DESCRIPTION OF THE DRAWINGS

FIG. 1 is a block sequence diagram of an example that illustrates a hybrid boot firmware (hybrid FW) store model in which both the NVMe device and the SPI NOR have original versions, in accordance with some aspects of the disclosed subject matter;

FIG. 2 is a block sequence diagram of the hybrid FW store model shown in FIG. 1 where an NVMe device with a newer version is attached but prior to updating the SPI NOR, in accordance with some aspects of the disclosed subject matter;

FIG. 3 is a block sequence diagram of the hybrid FW store model shown in FIG. 2 where an NVMe device with a newer version is attached and after updating the SPI NOR, in accordance with some aspects of the disclosed subject matter;

FIG. 4 is a block sequence diagram of an example that illustrates hybrid FW store model in which both the NVMe device and the SPI NOR have up-to-date versions;

FIG. 5 is a block sequence diagram of the hybrid FW store model shown in FIG. 4 where an NVMe device with an older version is attached;

FIG. 6 is a block sequence diagram of the hybrid FW store model shown in FIG. 5 where the NVMe device has been updated;

DETAILED DESCRIPTION

Figure 7:
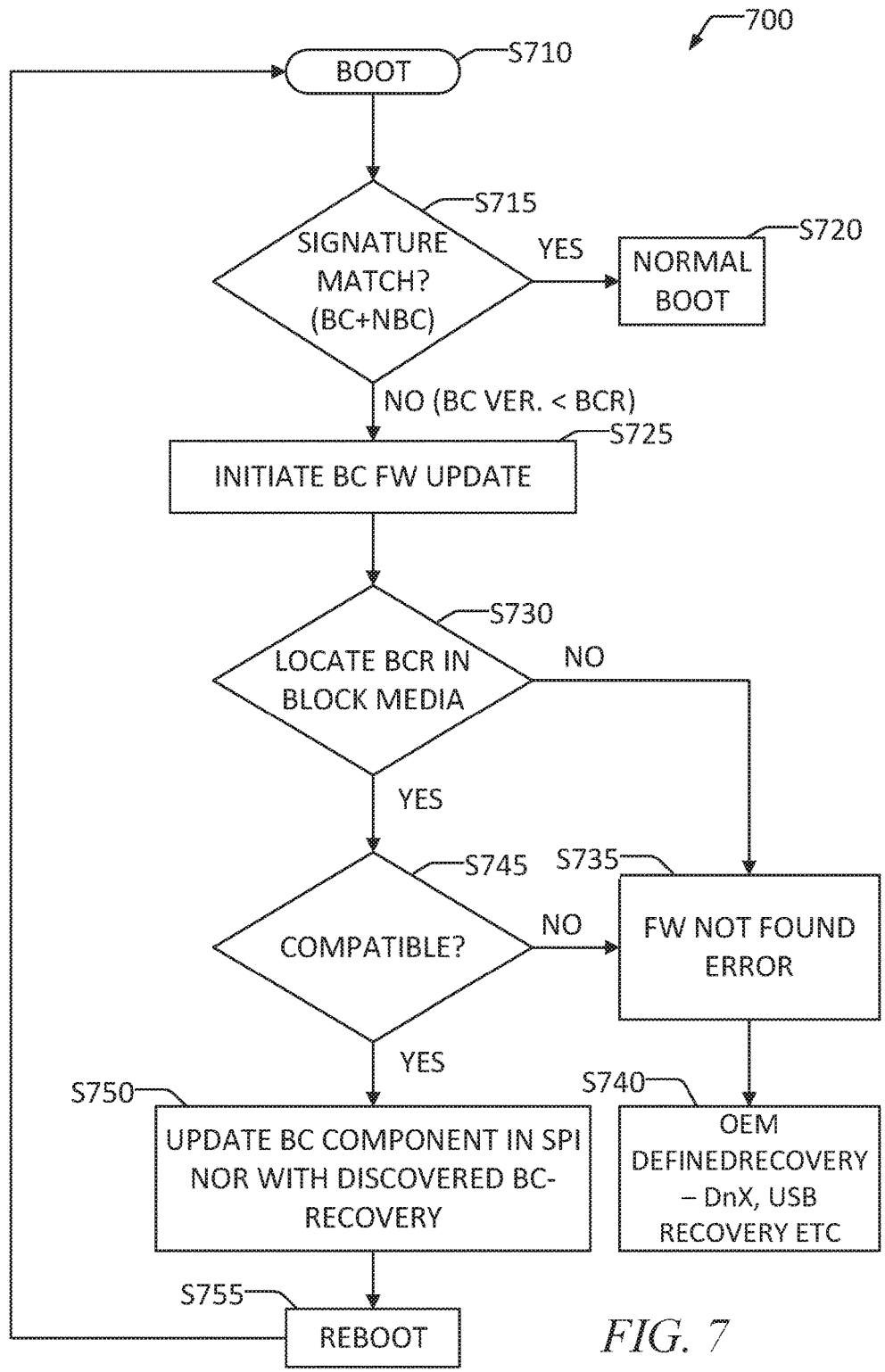
FIG. 7 is a flowchart of a process for updating when the boot critical SPI NOR version is less than the version of an NVMe device, in accordance with some aspects of the disclosed subject matter.

The following is a detailed description of various configurations depicted in the accompanying drawings. However, the amount of detail offered is not intended to limit anticipated variations of the described configurations; to the contrary, the claims and detailed description are to cover all modifications, equivalents, and alternatives falling within the spirit and scope of the present teachings as defined by the claims. The detailed descriptions below are designed to make such configurations understandable to a person having ordinary skill in the art.

Enabling a complete computer system firmware boot from an NVMe storage device helps reduce costs associated with an SPI NOR on a manufacturer's bill of materials (BOM) for the device. The SPI NOR may be a flash memory, and both the NVME and SPI NOR are non-volatile, meaning they are capable of retaining memory when power is off. A complete system firmware boot from an NVMe boot partition may be beneficial, but require certain changes over existing implementations.

FIGS. 1 to 6 are block sequence diagrams of examples that illustrate sequences of a hybrid boot firmware (hybrid FW) store model (a computer boot apparatus) 100A-100C (reference numbers herein containing letters at the end may be collectively or representatively indicated by the number alone, e.g., 100A, 100B and 100C may be referred to as 100) that splits the storage of boot instructions used in the boot process between a primary boot component 150 and a secondary boot component 110. The primary boot component 150, which may be, for example, fixedly mounted to a motherboard or other system board of a computer, may be configured to initialize a boot of the computer.

FIG. 1 reflects an original configuration of the hybrid FW 100A with an original NVME 110A and original SPI NOR 150A. FIG. 2 reflects a configuration of the hybrid FW 100B where a user has plugged in a newer version of the NVMe device 110B, but prior to updating the SPI NOR 150A. FIG. 3 reflects a configuration of the hybrid FW 100C with the updated NVMe device 110B.

The secondary boot component 110, which may be, for example, removably attached to the computer, may be configured to complete the boot of the computer via a non-critical boot component, discussed below. The terms "fixedly" and "removably", as used herein, are meant to be with relationship to the intended use of a typical consumer using the product, and not with relationship to a repair/maintenance person. Thus, a typical consumer would not be expected to remove components with a soldering iron or pull chips from chip sockets.

As may be seen in FIG. 1, with the hybrid FW in a first state 100A, the system firmware (system boot critical firmware (BC FW) or boot critical portion) 152A may be stored on the primary boot component 150A, which may be an SPI NOR (e.g., by independent basic input output service (BIOS) vendors). The non-boot-critical firmware portion 130A, containing non-boot-critical portion instructions may be stored on the secondary boot component 110A (and which may be the bulk of the secondary boot component), such as block media like an NVMe storage device, and may take advantage of an NVMe boot partition of the NVMe storage device (such as NVME 3D XPoint™). Boot critical components 152 are components that are required for the system to recover if it gets corrupted. Examples may include components for loading microcode on a CPU and memory initialization. Non-boot critical components 130 are platform features and device initialization components. Examples may include components such as hard disk security and touch-panel or touch pad device initialization components. The system may be recovered using boot critical components 152 even if non-boot critical components 130 get corrupted.

This hybrid FW 100 with a split store hybrid boot may reduce the amount of platform flash (SPI NOR) BOM significantly (at the time of this application, 16 MB or 32 MB of SPI NOR flash costs approximately $0.70-1.00; reducing the SPI NOR flash to 4 MB may reduce its cost to $0.30). This may be advantageous in modern systems where the SPI flash size has been increasing rapidly to handle greater functionality. One issue related to the hybrid FW is that NVMe comes in various form factors, including a detachable/removable form factor that may plug into a bus 140 of the PC. Therefore, it is important to maintain boot capability and data integrity on NVMe devices 110A when they replaced/removed.

The system described herein may provide, for example: data integrity between the NVMe storage device 110A and the SPI NOR 150A (initial firmware boot storage), a seamless and better user experience on an upgrade/portability/recovery mechanism for removable NVMe storage/boat devices 110A, version management between NVMe storage device 110A upgrades, an authenticated split stored firmware (SPI-NOR and NVMe) pair, and a reduced firmware upgrade cost in manufacturing when upgrading the NVMe storage device 110A on platforms.

This may be achieved by, for example, implanting an intelligent sync (boot policy) manager component 156A in system firmware layout in the initial BC firmware image 152A which resides on the SPI NOR 150A that may be hardwired onto a motherboard of a PC. The sync (policy) manager component 156A residing in the boot critical (BC) component 150A may be responsible for: verifying/authenticating the non-boot critical (NBC) FW image 130A in the NVMe storage device 110A, version management between the split storage device (SPI NOR 150A and NVMe 110A), and ensuring that both FW image versions (via version identifiers 112A, 154A) are in sync. As illustrated in FIG. 1, version identifiers 112A, 154A are alphanumeric values, however, these identifiers may be in any form, including text, that permits a determination to be made as to whether the versions are the same or whether one version is a later version than the other. A boot critical recovery (BCR) 120A portion or component (that may be a kind of a duplicate copy of the BC component 152) may be included on the NVMe device 110A that may be copied or translated to the SPI NOR 150A, discussed in more detail below.

The sync manager 156A may verify, in addition to a version number, that the NBC 130A is the matching pair element to the BC 150A, based on brand compatibility or other criteria. For example, a user may use a Dell® NVMe drive with a Dell® NBC on a Lenovo® system, since the NVMe storage is the removable device. The sync manager 156A in the Lenovo® system's SPI NOR (the BC component) may verify that NBC in NVMe is the correct element for the matching pair. The same applies within the same OEM but for different generation of platforms. For example, a user should not attempt to install a newer Intel generation of an NBC NVMe and boot it with an older Intel generation platform. Additionally, the sync manager 156A may perform a data integrity check to verify that the NBC image is not corrupted or modified in order to prevent a security attack. The data integrity check may utilize, for example, the Intel® Authenticated Code Module (ACM)-based secure boot that verifies a known and trusted BIOS is booting the platform, as well as the Intel® Platform Protection Technology with BIOS Guard, which provides hardware-assisted authentication and protection against BIOS recovery attacks. This data integrity check may also be part of the sync manager 156A to verify and protect the integrity of the NBC 130 in the NVMe storage 110.

The sync manager 156A, which may reside on the BC firmware (SPI NOR 150A), may version check and verify the BCR portion 112A on the removable storage media (NVMe device 110A) boot partition and maintain a secure sync between the BCR portion 120A, containing information to update the SPI NOR 150A, and the BC component 152A and its instructions on the SPI NOR 150A for performing the initial part of the boot If the verification is successful (e.g., the versions match), the PC may try to boot from the NVMe storage device 110. If the verification does not pass, then the system may decide whether to enable upgrade or downgrade the system program(s), e.g., the BC component 152, the sync manager 156, and the NBC 130.

The sync manager 156A may perform a secure update by the entity having a lower version in the case of a version mismatch. With an NVMe storage solution used in memory intensive applications, such as in-memory databases, cloud computing applications, the solution provided herein enables those in the storage industry to provide a seamless user experience, and a reliable and secure solution for firmware storage.

In some situations, the version stored on the NVMe storage device may be updated, such as when a software upgrade occurs. A new V2 version 112B of the software is illustrated in FIG. 2. As shown in FIG. 2, if the versions are out of sync, and the NVMe device 110B has a higher version number 112B (V2 versus V1 for the BC component 152A of the SPI NOR 150A), the sync manager 156A component locates the newer version of the BCR portion 120B and/or NBC component 13013 in the NVMe device 110B and updates 170 the BC component 152A in the initial FW boot device (SPI NOR) 150A. The end result may be seen in FIG. 3, where the BC component 152B in the SPI NOR. 150B has been updated to V2 154B. The update may or may not include the sync manager 156B.

FIGS. 4-6 are sequence diagrams of an example hybrid FW 100 being updated when an older version of the NVMe device 110A is plugged into a newer version SPI NOR. 150B.

FIG. 4 reflects an up-to-date configuration of the hybrid FW 100B with an up-to-date NVME 110B and up-to-date SPI NOR 150B. FIG. 5 reflects a configuration of the hybrid FW 100A where a user has plugged in an older version of the NVMe device 110A, but prior to it being updated. FIG. 6 reflects a configuration of the hybrid FW 100C with the updated NVMe device 110B.

Referring to FIGS. 4 to 6, if versions 112A, 154B are out of sync, as illustrated in FIG. 5, and the NVMe device 110A has a BCR 120A with a lower version number than the BC component 152B in the SPI NOR 150B, different options may be considered. In one implementation, the sync manager 156B may request user input or a user selection to let the user decide on an update action, such as to update the NVMe 110A or the BC component 152B version using the BCR in the NVMe, or download a new version for the NVMe or the BC component 152B from an external source 180 (such as via Universal Serial Bus (USB), Intel Download and Execute DnX®, Wi-Fi, or Intel® Active Management Technology (AMT)). The user input or user selection for update actions can similarly be utilized in the design illustrated in FIGS. 1 to 3 when the NVMe device 110B has a BCR 12B with a higher number than the BC component 152A in the SPI NOR 150A. The user input may indicate a source of the update, a target of the update (either expressly or implicitly—that is, if the source of the update is the BCR 120, then the target of the update may implicitly be the BC component 152). When the BC component is updated, the sync manager 156 may be updated as well, or, in an implementation, the sync manager 156 may be updated using any of the techniques discussed above independently of the BC component 152.

Other ways to update the NVMe 110A with the BC component 152B in place may be to utilize universal serial bus (USB), serial AT attachment (SATA), embedded multimedia controller (eMMC), universal flash storage (UFS), or any storage device from which the BC component 152B driver is able to read. Additionally, the NVMe component 110B driver may be downloaded over a wireless interface, such as or Bluetooth. The location may be implementation specific, and, for example, an OEM may simply search in one or more established locations or use one or more established protocols. For example, the search may be for a filename "abcd.rom" in the storage device EFI file system, where "abcd" is a manufacturer's name.

The sync manager 156B may receive the user selection and perform the user-selected operations. If the BC component 150B is unable to locate the NBC component 130A, or finds incompatible FW in the NVMe device 110A, the sync manager 156B may inform the user of the error in an error procedure, and enable NBC 130A recovery options via USB/Secure Digital (SD) card devices. This provides a good upgrade model for computer system providers without the need for extra hardware for removable NVMe devices 110 on a system. In one implementation, it may be possible to downgrade the BC component 152B and/or the policy manager 156B on the SPI NOR 150B to be compatible. This is a choice that an OEM may decide to let the user make.

If a new model NVMe Device 110 is plugged into the PC that is not at all compatible or an upgrade is not able to be located, the sync manager 156 may indicate that an error has occurred or provide an error handling mechanism. In order for the sync manager 156 to determine whether there is a mismatch or not, it may read future versions of the NVMe device. Therefore, it is desirable that future versions of the NVMe devices have some commonality/consistency (e.g., location and format of the version number) to ensure earlier versions of the sync manager 156 may read them.

FIG. 7 is a flowchart of a process 700 for updating when the boot critical SPI NOR version is less than the version of an NVMe device, in accordance with some aspects of the disclosed subject matter. The process 700 begins with a boot operation S710. At some point in the boot up, the sync manager 156 may, at operation S715, verify some form of a version or signature match between the BC component 152 and the NBC 130. If they match (S715:Yes), then a normal boot S720 may take place.

If they do not match (S715:No), and the BC component 152 version is lower than the BCR 120 or NBC 130 in the block media element or NVMe 110, then the sync manager 156 may initiate a BC FW update in operation S725. This may be achieved by locating, in operation S730, the BCR 120 in the block media 110. If the BCR 120 is unable to be located in the block media, a "not found" error may be generated in operation S735, and some form of recovery operation S740 may be initiated. If the BCR 120 is located in the block media, then compatibility is checked S745. If the located BCR 120 is not compatible with the BC component 152 (S745:No), then the error handling of operations S735 and S740 may be invoked. Otherwise (S745:Yes), the BC component 152 in the SPI NOR 150 may be updated with the BCR 120 (S750), and the system rebooted S755.

In sum, according to an implementation, the version compare may be between the BC component 152 and either/both of the BCR 120 and the NBC 130. The BCR 120 may update the BC component 152 with its own data, but if the BC component 152 does not update the BCR 120 with its own data, and when the BCR 120 and/or NBC 130 is updated, there is some external source for the update.

Figure 8:
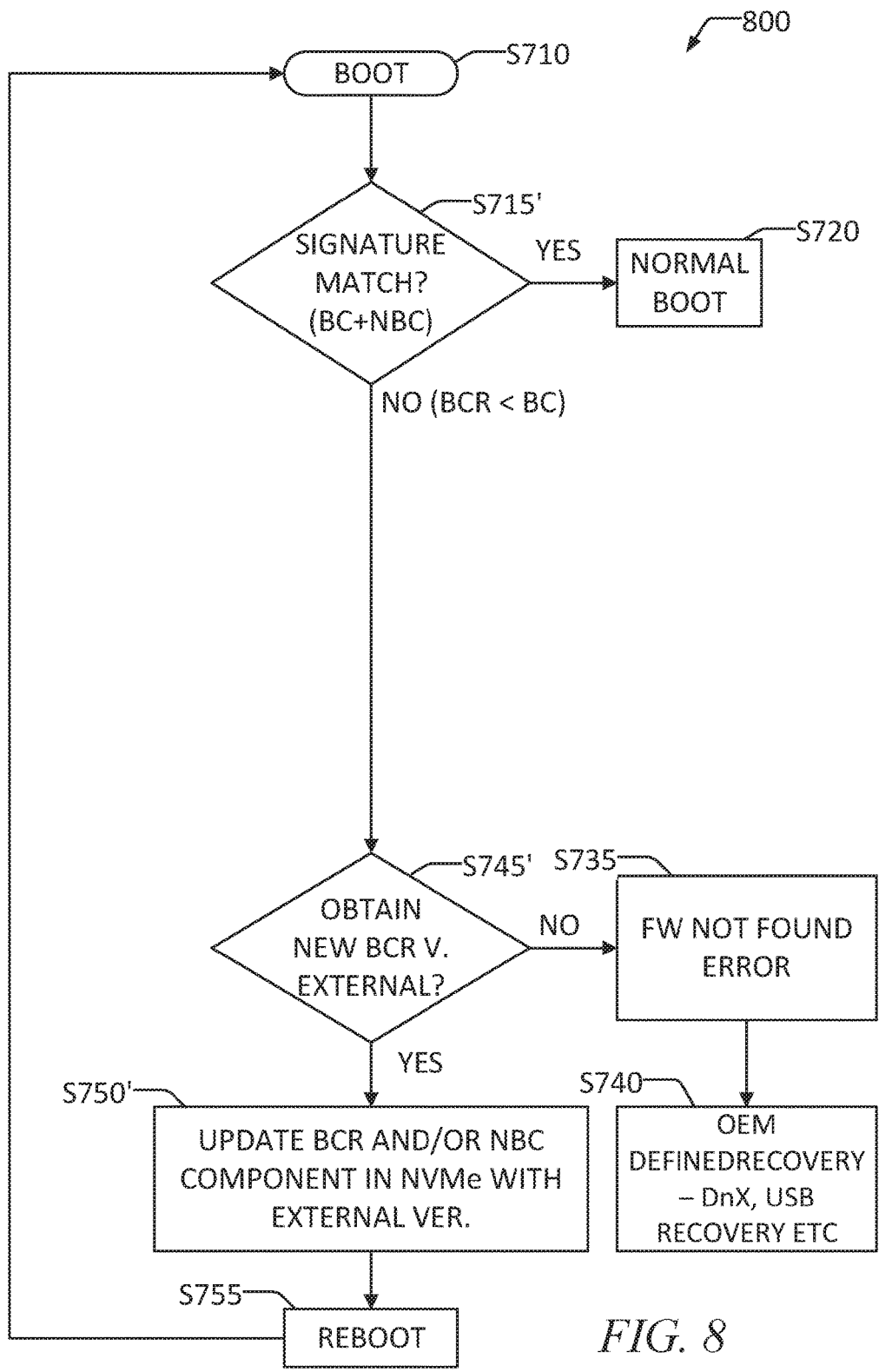
FIG. 8 is a flowchart of a process for updating when the boot critical SPI NOR version is greater than the version of an NVMe device, in accordance with some aspects of the disclosed subject matter.

FIG. 8 is a flowchart of a process 800 similar to the process 700 of FIG. 7, but shows a different flow if, at operation S715', the BCR 120 or NBC 130 version is lower than the BC component 152 version. In this case, it is determined, at operation S745' whether a new BCR 120 and NBC 130 may be obtained from some external source, as described above. If so (S745':Yes), then the BCR 120 and/or NBC 130 component may be updated accordingly (S750'). If not (S745':No), then the error handling as described above is undertaken at operation S735.

Figure 9:
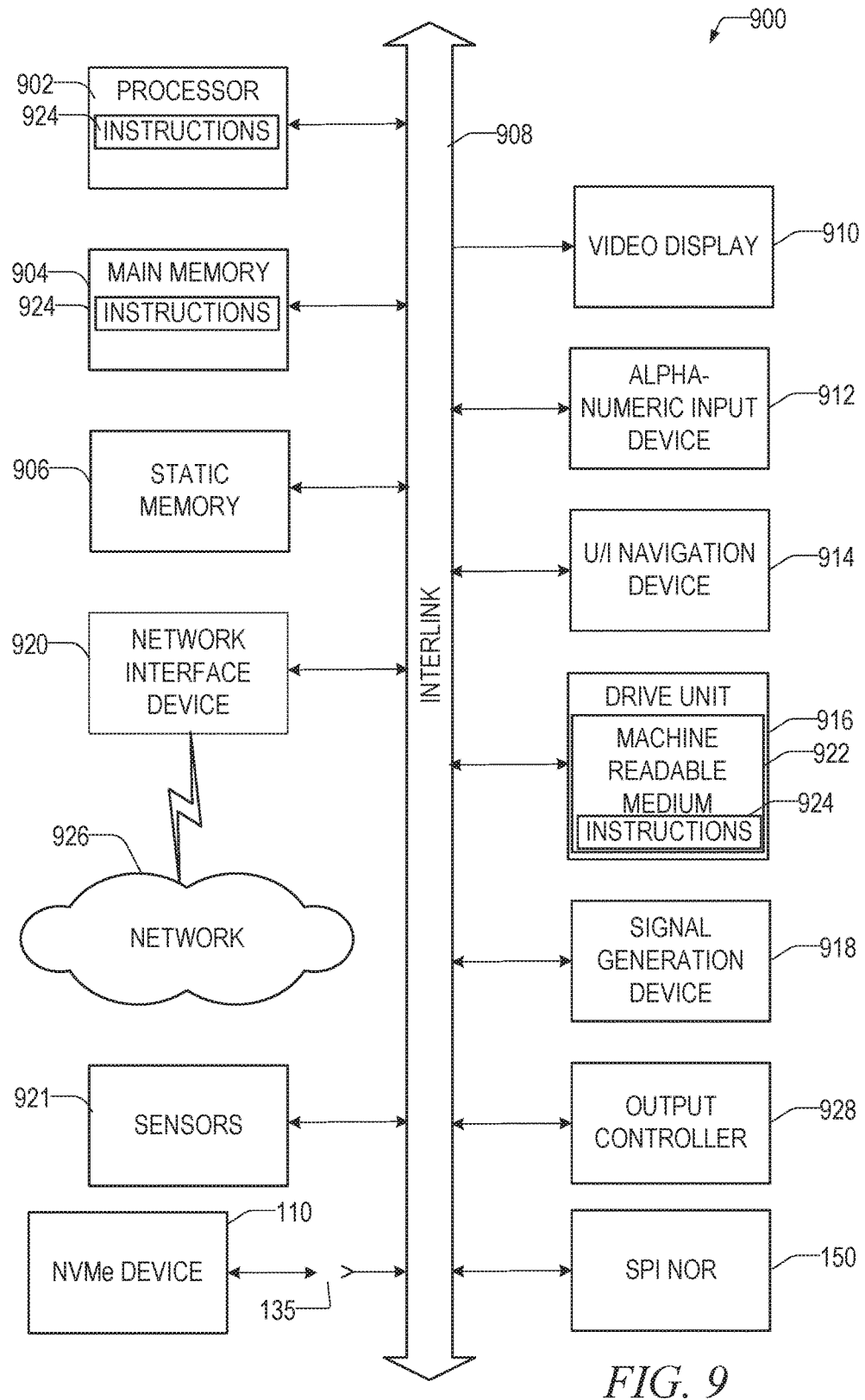
FIG. 9 is a block diagram illustrating a machine that may be a computer on which various components described herein may reside and processes described herein may be performed, in accordance with some aspects of the disclosed subject matter.

FIG. 9 is a block diagram illustrating a machine that may be a computer on which various components described herein may reside and processes described herein may be performed. The machine (e.g., computer) 900 may include the SPI NOR 150 and a physical connector 135 for the NVMe device 110 that connects this device to the machine 900. The machine 900 may include a hardware processor 902 (e.g., a central processing unit (CPU), which may be an implementation of the processor 922 discussed above, a graphics processing unit (GPU), a hardware processor core, or any combination thereof), a main memory 904 and a static memory 906, which may be an implementation of the memory 924 discussed above, some or all of which may communicate with each other via an interlink (e.g., bus) 908 (which may be the bus 140, discussed above). The machine 900 may further include a display unit 910, an alphanumeric input device 912 (e.g., a keyboard), and a user interface (UI) navigation device 914 (e.g., a mouse). In an example described herein, the display unit 910, input device 912 and UI navigation device 914 may be a touch screen display. The machine 900 may additionally include a storage device 916 (e.g., drive unit, which may be a part of the NVMe device 110), a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB)), parallel, or other wired or wireless (e.g., infrared(IR), near field communication (NFC), etc.) controller connection to communicate or control one or more peripheral devices (e.g., a printer, card reader, etc.).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, and/or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 924 may further be transmitted or received over the communications network 926 using a transmission medium via the network interface device 920. The term "transmission medium" is defined herein to include any medium that is capable of storing, encoding, or carrying instructions for execution by the machine, and includes digital or analog communications signals or other medium to facilitate communication of such software.

The machine 900 may communicate with one or more other machines 900 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, WiGig®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, virtual private networks (VPN), or any other way of transferring data between machines 900. In an example, the network interface device 920 may include one or more physical jacks (e.g., Ethernet, coaxial, or phone jacks) or one or more antennas to connect to the communications network 926.

In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques.

A wide variety of computing devices may constitute a machine 900, as described herein. The following list includes a variety of devices that may fit the definition of a machine 900: a personal data assistant (PDA), a cellular telephone, including a smartphone, a tablet computing device, a laptop computer, a desktop computer, a workstation, a server computer, a mainframe computer, and the like.

For the purposes of promoting an understanding of the principles of this disclosure, reference has been made to the various configurations illustrated in the drawings, and specific language has been used to describe these configurations. However, no limitation of the scope of the inventive subject matter is intended by this specific language, and the inventive subject matter should be construed to encompass all aspects and configurations that would normally occur to one of ordinary skill in the art. The configurations herein may be described in terms of functional block components and various processing steps. Such functional blocks may be realized by any number of components that perform the specified functions. The particular implementations shown and described herein are illustrative examples and are not intended to otherwise limit the scope of the inventive subject matter in any way. The connecting lines, or connectors shown in the various figures presented may, in some instances, be intended to represent example functional relationships and/or physical or logical couplings between the various elements. However, many alternative or additional functional relationships, physical connections or logical connections may be present in a practical device. Moreover, no item or component is essential unless the element is specifically described as "essential" or "critical". Numerous modifications and adaptations will be readily apparent to those skilled in this art.

EXAMPLES

Example 1 is a computer boot apparatus for controlling a computer boot up procedure, comprising: a primary boot component that is fixedly mounted in a computer, comprising: a firmware element that is a non-volatile memory, comprising: a boot critical portion comprising instructions that, when executed on a processor, initiate a boot of the computer; a first version identifier; and a policy manager; wherein: the primary boot component is to initialize the boot of the computer via the boot critical portion; and the policy manager is to verify and authenticate a secondary boot component that is removably attached to the computer.

In Example 2, the subject matter of Example 1 optionally includes wherein policy manager is to verify and authenticate the secondary boot component to: compare the first version identifier via a second version identifier of the secondary boot component; when the first version identifier and the second version identifier are equal, then complete the initialization of the boot and allow the secondary boot component to continue the boot with a non-critical boot component stored within the secondary boot component; and when the first version identifier is less than the second version identifier, then update the boot critical portion based on information stored in a boot critical recovery portion of the secondary boot component and perform a reboot of the computer.

In Example 3, the subject matter of any one or more of Examples 1-2 optionally include wherein the policy manager is to verify and authenticate the secondary boot component to: compare the first version identifier with a second version identifier of the secondary boot component; when the first version identifier and the second version identifier are equal, then complete the initialization of the boot and allow the secondary boot component to continue the boot with a non-critical boot component stored within the secondary boot component; and when the first version identifier is greater than the second version identifier, then update the boot critical portion based on information stored in a boot critical recovery portion of the secondary boot component and perform a reboot of the computer.

In Example 4, the subject matter of any one or more of Examples 1-3 optionally include wherein the policy manager is to verify and authenticate the secondary boot component to: compare the first version identifier with a second version identifier of the secondary boot component; when the first version identifier and the second version identifier are equal, then complete the initialization of the boot and allow the secondary boot component to continue the boot with a non-critical boot component stored within the secondary boot component; and when the first version identifier is greater than the second version identifier, then update the secondary boot component based on information from an external source and perform a reboot of the computer.

In Example 5, the subject matter of any one or more of Examples 1-4 optionally include wherein the policy manager is to: request user input related to an update to the primary boot component or the secondary boot component; receive a user selection related to the update; and perform an update action based on the received user selection.

In Example 6, the subject matter of Example 5 optionally includes wherein the user selection is selected from: perform an update of the secondary boot component based on information from an external source; perform an update of the secondary boot component based on information in the primary boot component; perform an update of the primary boot component based on information in the secondary boot component; and perform an update of the primary boot component based on information from the external source.

In Example 7, the subject matter of any one or more of Examples 3-6 optionally include wherein the policy manager is to: execute an error procedure when the secondary boot component is determined to be incompatible with the primary boot component or an upgrade is unable to be located.

In Example 8, the subject matter of any one or more of Examples 1-7 optionally include wherein an external source comprises one of a Universal Serial Bus device, Intel Download and Execute DnX®, a wireless interface, or Active Management Technology.

In Example 9, the subject matter of any one or more of Examples 1-8 optionally include wherein the wireless interface comprises one of Wi-Fi or Bluetooth.

In Example 10, the subject matter of any one or more of Examples 1-9 optionally include wherein the primary boot component utilizes a Serial Peripheral Interface NOR component.

In Example 11, the subject matter of any one or more of Examples 1-10 optionally include the secondary boot component, comprising: a block media element that is a non-volatile memory, comprising: a non-boot critical portion comprising instructions that are executed after the boot critical portion instructions; and a boot critical recovery portion comprising information to update the primary boot component.

In Example 12, the subject matter of Example 11 optionally includes wherein the secondary boot component utilizes a Non-volatile Memory Express (NVMe) component.

Example 13 is a method for operating a computer boot apparatus to control a computer boot up procedure, the computer boot apparatus comprising: a primary boot component that is fixedly mounted in a computer and has a firmware element that is a non-volatile memory, comprising: a boot critical portion comprising boot instructions executable on a processor of the computer; a first version identifier; and a policy manager; the method comprising: initializing a boot of the computer utilizing the boot critical portion; and verifying and authenticating, with the policy manager, a secondary boot component that is removably attached to the computer.

In Example 14, the subject matter of Example 13 optionally includes comparing, by the policy manager, the first version identifier with a second version identifier of the secondary boot component, the secondary boot component comprising a block media element that is a non-volatile memory; when the first version identifier and the second version identifier are equal, then completing the initializing of the boot and allowing the secondary boot component to continue the boot using a non-critical boot component stored within the secondary boot component; and when the first version identifier is less than the second version identifier, then updating the boot critical portion based on information stored in a boot critical recovery portion of the secondary boot component and performing a reboot of the computer.

In Example 15, the subject matter of Example 14 optionally includes allowing access of the boot critical recovery portion of the secondary boot component to the policy manager of the primary boot component; and completing the boot based on a non-boot-critical portion of the secondary boot component.

In Example 16, the subject matter of Example 15 optionally includes wherein: the primary boot component utilizes a Serial Peripheral Interface NOR component; and the secondary boot component utilizes a Non-volatile Memory Express (NVMe) component.

In Example 17, the subject matter of any one or more of Examples 13-16 optionally include comparing the first version identifier with a second version identifier of the secondary hoot component; when the first version identifier and the second version identifier are equal, then completing the initialize of the boot and allowing the secondary boot component to continue the boot using a non-critical boot component stored within the secondary boot component; and when the first version identifier is greater than the second version identifier, then updating the boot critical portion based on information stored in a boot critical recovery portion of the secondary boot component and performing a reboot of the computer.

In Example 18, the subject matter of any one or more of Examples 13-17 optionally include comparing the first version identifier with a second version identifier of the secondary boot component; when the first version identifier and the second version identifier are equal, then completing the initialize of the boot and allowing the secondary boot component to continue the boot using a non-critical hoot component stored within the secondary boot component; and when the first version identifier is greater than the second version identifier, then updating the secondary boot component based on information from an external source and performing a reboot of the computer.

In Example 19, the subject matter of any one or more of Examples 13-18 optionally include by the policy manager: requesting user input related to an update to the primary boot component or the secondary boot component; receiving a user selection related to the update; and performing an update action based on the received user selection.

In Example 20, the subject matter of Example 19 optionally includes wherein the user selection is selected from: performing an update of the secondary boot component based on information from an external source; performing an update of the secondary boot component based on information in the primary boot component; performing an update of the primary boot component based on information in the secondary boot component; and performing an update of the primary boot component based on information from the external source.

In Example 21, the subject matter of any one or more of Examples 17-20 optionally include by the policy manager: executing an error procedure when the secondary boot component is determined to be incompatible with the primary boot component or an upgrade is unable to be located.

In Example 22, the subject matter of any one or more of Examples 13-21 optionally include wherein an external source comprises one of a Universal Serial Bus device, Intel Download and Execute DnX®, a wireless interface, or Active Management Technology.

In Example 23, the subject matter of any one or more of Examples 13-22 optionally include wherein the wireless interface comprises one of Wi-Fi or Bluetooth.

In Example 24, the subject matter of any one or more of Examples 13-23 optionally include wherein the primary boot component utilizes a Serial Peripheral Interface NOR component.

In Example 25, the subject matter of any one or more of Examples 13-24 optionally include wherein: the secondary boot component comprises: a block media element that is a non-volatile memory and comprises: a non-boot critical portion comprising instructions that are executed after the boot critical portion instructions; and a boot critical recovery portion comprising information to update the primary boot component.

In Example 26, the subject matter of Example 25 optionally includes wherein the secondary boot component utilizes a Non-volatile Memory Express (NVMe) component.

Example 27 is a computer program product that is a primary boot component for controlling a computer boot up procedure comprising at least one computer readable storage media comprising computer-executable instructions operable to, when executed by processing circuitry of a computer, configure the computer to: initialize a boot of the computer via a boot critical portion of the primary boot component; and verify and authenticate, with a policy manager of the primary boot component, a secondary boot component that is removably attached to the computer.

In Example 28, the subject matter of Example 27 optionally includes wherein the instructions are further operable to: compare, by the policy manager, a first version identifier of the primary boot component with a second version identifier of a secondary boot component, the secondary boot component comprising a block media element that is a non-volatile memory; when the first version identifier and the second version identifier are equal, then complete the initialization of the boot and allow the secondary boot component to continue the boot via a non-critical boot component stored within the secondary boot component; and when the first version identifier is less than the second version identifier, then update the boot critical portion based on information stored in a boot critical recovery portion of the secondary boot component and perform a reboot of the computer.

In Example 29, the subject matter of any one or more of Examples 27-28 optionally include wherein the instructions are further operable to: compare, by the policy manager, a first version identifier with a second version identifier of the secondary boot component; when the first version identifier and the second version identifier are equal, then complete the initialization of the boot and allow the secondary boot component to continue the boot using a non-critical boot component stored within the secondary boot component; and when the first version identifier is greater than the second version identifier, then update the boot critical portion based on information stored in a boot critical recovery portion of the secondary boot component and perform a reboot of the computer.

In Example 30, the subject matter of any one or more of Examples 27-29 optionally include wherein the instructions are further operable to: compare, by the policy manager, a first version identifier with a second version identifier of the secondary boot component; when the first version identifier and the second version identifier are equal, then complete the initialization of the boot and allow the secondary boot component to continue the boot using a non-critical boot component stored within the secondary boot component; and when the first version identifier is greater than the second version identifier, then update the secondary boot component based on information from an external source and perform a reboot of the computer.

In Example 31, the subject matter of any one or more of Examples 27-30 optionally include wherein: the primary boot component utilizes a Serial Peripheral Interface NOR component; and the secondary boot component utilizes a Non-volatile Memory Express (NVMe) component.

Example 32 is a computer program product comprising at least one computer readable storage media comprising computer-executable instructions operable to, when executed by processing circuitry of a device, configure the apparatus to perform any of the methods of Examples 13-26 for controlling a computer boot up procedure.

Example 33 is a computer boot apparatus for controlling a computer boot up procedure, comprising: a processor; a bus; a user interface; and a primary boot component that is fixedly mounted in the computer, and connected to the computer via the bus, the primary boot component comprising: a firmware element that is a non-volatile memory, comprising: a boot critical portion comprising instructions that, when executed on the processor, initiate a boot of the computer; a first version identifier; and a policy manager; wherein: the primary boot component is to initialize a boot of the computer utilizing the boot critical portion; and the policy manager is to verify and authenticate a secondary boot component that is removably attached to the computer.

In Example 34, the subject matter of Example 33 optionally includes the secondary boot component, comprising: a block media element that is a non-volatile memory, comprising: a non-boot critical portion comprising instructions that are executed after the boot critical portion instructions; and a boot critical recovery portion comprising information to update the primary boot component.

Example 35 is a system for controlling a computer boot up procedure comprising means to perform any of the methods of Examples 13-26.

Example 36 is a computer boot apparatus that performs an initial boot up sequence of a computer, comprising: a primary boot component that is fixedly mounted in a computer and has a firmware element that is a non-volatile memory, comprising: a boot critical portion comprising boot instructions executable on a processor of the computer; a first version identifier; and a policy manager; means for initializing a boot of the computer utilizing the boot critical portion; and means for verifying and authenticating, with the policy manager, a secondary boot component that is removably attached to the computer.

In Example 37, the subject matter of Example 36 optionally includes means for comparing, by the policy manager, the first version identifier with a second version identifier of the secondary boot component, the secondary boot component comprising a block media element that is a non-volatile memory; means for, when the first version identifier and the second version identifier are equal, then completing the initializing of the boot and allowing the secondary boot component to continue the boot using a non-critical boot component stored within the secondary boot component; and means for, when the first version identifier is less than the second version identifier, then updating the boot critical portion based on information stored in a boot critical recovery portion of the secondary boot component and performing a reboot of the computer.

In Example 38, the subject matter of Example 37 optionally includes means for allowing access of the boot critical recovery portion of the secondary boot component to the policy manager of the primary boot component; and means for completing the boot based on a non-boot-critical portion of the secondary boot component.

In Example 39, the subject matter of Example 38 optionally includes wherein: the primary boot component utilizes a Serial Peripheral Interface NOR component; and the secondary boot component utilizes a Non-volatile Memory Express (NVMe) component.

In Example 40, the subject matter of any one or more of Examples 36-39 optionally include means for comparing the first version identifier with a second version identifier of the secondary boot component; means for, when the first version identifier and the second version identifier are equal, then completing the initialize of the boot and allowing the secondary boot component to continue the boot using a non-critical boot component stored within the secondary boot component; and means for, when the first version identifier is greater than the second version identifier, then updating the boot critical portion based on information stored in a boot critical recovery portion of the secondary boot component and performing a reboot of the computer.

In Example 41, the subject matter of any one or more of Examples 36-40 optionally include means for comparing the first version identifier with a second version identifier of the secondary boot component; means for, when the first version identifier and the second version identifier are equal, then completing the initialize of the boot and allowing the secondary boot component to continue the boot using a non-critical boot component stored within the secondary boot component; and means for, when the first version identifier is greater than the second version identifier, then updating the secondary boot component based on information from an external source and performing a reboot of the computer.

Example 42 is at least one machine-readable medium including instructions, which when executed by a machine, cause the machine to perform operations of any of the operations of Examples 1-41.

Example 43 is an apparatus comprising means for performing any of the operations of Examples 1-41.

Example 44 is a system to perform the operations of any of the Examples 1-41.

Example 45 is a method to perform the operations of any of the Examples 1-41.

The invention claimed is:

1. A computer boot apparatus for controlling a computer boot up procedure, comprising:
   a primary boot component that is fixedly mounted in a computer, comprising:
      a firmware element that is in a non-volatile memory, comprising:
         a boot critical portion comprising instructions that, when executed on a processor, initiate a boot of the computer;
         a first version identifier; and
         a policy manager;
   wherein
      the primary boot component is to initialize the boot of the computer via the boot critical portion;
      the policy manager is to verify and authenticate a secondary boot component that is removably attached to the computer;
      the primary boot component utilizes a Serial Peripheral Interface NOR component; and
      the secondary boot component utilizes a Non-volatile Memory Express (NVMe) component.

2. The computer boot apparatus of claim 1, wherein policy manager is to verify and authenticate the secondary boot component to:
   compare the first version identifier with a second version identifier the secondary boot component;
   when the first version identifier and the second version identifier are equal, then complete the initialization of the boot and allow the secondary boot component to continue the boot with a non-critical boot component stored within the secondary boot component; and
   when the first version identifier is less than the second version identifier, then update the boot critical portion based on information stored in a boot critical recovery portion of the secondary boot component and perform a reboot of the computer.

3. The computer boot apparatus of claim 1, wherein the policy manager is to verify and authenticate the secondary boot component to:
   compare the first version identifier with a second version identifier of the secondary boot component;
   when the first version identifier and the second version identifier are equal, then complete the initialization of the boot and allow the secondary boot component to continue the boot with a non-critical boot component stored within the secondary boot component; and
   when the first version identifier is greater than the second version identifier, then update the boot critical portion based on information stored in a boot critical recovery portion of the secondary boot component and perform a reboot of the computer.

4. The computer boot apparatus of claim 1, wherein the policy manager is to verify and authenticate the secondary boot component to:
   compare the first version identifier with a second version identifier of the secondary boot component;
   when the first version identifier d the second version identifier are equal, then complete the initialization of the boot and allow the secondary boot component to continue the boot with a non-critical boot component stored within the secondary boot component; and when the first version identifier is greater than the second version identifier, then update the secondary boot component based on information from an external source and perform a reboot of the computer.

5. The computer boot apparatus of claim 1, wherein the policy manager is to:

request user input related to an update to the primary boot component or the secondary boot component;

receive a user selection related to the update; and perform an update action based on the received user selection.

6. The computer boot apparatus of claim 5, wherein the user selection is selected from:

perform an update of the secondary boot component based on information from an external source;

perform an update of the secondary boot component based on information in the primary boot component;

perform an update of the primary boot component based on information in the secondary boot component; and perform an update of the primary boot component based on information from the external source.

7. The computer boot apparatus of claim 3, wherein the policy manager is to:

execute an error procedure when the secondary boot component is determined to be incompatible with the primary boot component or an upgrade is unable to be located.

8. The computer boot apparatus of claim 1, wherein an external source comprises one of a Universal Serial Bus device, a wireless interface, or Active Management Technology.

9. The computer boot apparatus of claim 1, wherein the wireless interface comprises Wi-Fi.

10. The computer boot apparatus of claim 1, further comprising:

the secondary boot component, comprising:
  a block media element that is in a non-volatile memory, comprising:
    a non-boot critical portion comprising instructions that are executed after the boot critical portion instructions; and
    a boot critical recovery portion comprising information to update the primary boot component.

11. A method for operating a computer boot apparatus to control a computer boot up procedure, the computer boot apparatus comprising:

a primary boot component that is fixedly mounted in a computer and has a firmware element that is in a non-volatile memory, wherein the primary boot component utilizes a Serial Peripheral Interface NOR component, comprising:
  a boot critical portion comprising boot instructions executable on a processor of the computer;
  a first version identifier; and
  a policy manager;
the method comprising:
  initializing a boot of the computer utilizing boot critical portion; and
  verifying and authenticating, with the policy manager, a secondary boot component that is removably attached to the computer, wherein the secondary boot component utilizes a Non-volatile Memory Express (NVMe) component.

12. The method of claim 11, further comprising:

comparing, by the policy manager, the first version identifier with a second version identifier of the secondary boot component, the secondary boot component comprising a block media element that is in a non-volatile memory;

when the first version identifier and the second version identifier are equal, then completing the initializing of the boot and allowing the secondary boot component to continue the boot using a non-critical boot component stored within the secondary boot component; and when the first version identifier is less than the second version identifier, then updating the boot critical portion based on information stored in a boot critical recovery portion of the secondary boot component and performing a reboot of the computer.

13. The method of claim 12, further comprising:

allowing access of the boot critical recovery portion of the secondary boot component to the policy manager of the primary boot component; and completing the boot based on a non-boot-critical portion of the secondary boot component.

14. The method of claim 11, further comprising:

comparing the first version identifier with a second version identifier of the secondary boot component;

when the first version identifier and the second version identifier are equal, then completing the initialization of the boot and allowing the secondary boot component to continue the boot using a non-critical boot component stored within the secondary boot component; and when the first version identifier is greater than the second version identifier, then updating the boot critical portion based on information stored in a boot critical recovery portion of the secondary boot component and performing a reboot of the computer.

15. The method of claim 11, further comprising:

comparing the first version identifier with a second version identifier of e secondary boot component;

when the first version identifier and the second version identifier are equal, then completing the initialize of the boot and allowing the secondary boot component to continue the boot using a non-critical boot component stored within the secondary boot component; and when the first version identifier is greater than the second version identifier, then updating the secondary boot component based on information from an external source and performing a reboot of the computer.

16. A non-transitory computer program product that is a primary boot component for controlling a computer boot up procedure comprising at least one computer readable storage media comprising computer-executable instructions operable to, when executed by processing circuitry of a computer, configure the computer to:

initialize a boot of the computer via a boot critical portion of the primary boot component, wherein he primary boot component utilizes a Serial Peripheral Interface NOR component; and verify and authenticate, with a policy manager of the primary boot component, a secondary boot component that is removably attached to the computer, wherein the secondary boot component utilizes a Non-volatile Memory Express (NVMe) component.

17. The non-transitory computer program product of claim 16, wherein the instructions are further operable to:

compare, by the policy manager, a first version identifier of the primary boot component with second version identifier of a secondary boot component, the secondary boot component comprising a block media element that is in a non-volatile memory;

when the first version identifier and the second version identifier are equal, then complete the initialization of the boot and allow the secondary boot component to continue the boot via a non-critical boot component stored within the secondary boot component; and when the first version identifier is less than the second version identifier, then update the boot critical portion based on information stored in a boot critical recovery portion of the secondary boot component and perform a reboot of the computer.

18. The non-transitory computer program product of claim 16, wherein the instructions are further operable to:

compare, by the policy manager, a first version identifier with a second version identifier of the secondary boot component;

when the first version identifier and the second version identifier are equal, then complete the initialization of the boot and allow the secondary boot component to continue the boot using a non-critical boot component stored within the secondary boot component; and when the first version identifier is greater than the second version identifier, then update the boot critical portion based on information stored in a boot critical recovery portion of the secondary boot component and perform a reboot of the computer.

19. The non-transitory computer program product of claim 16, wherein the instructions are further operable to:

compare, by the policy manager, a first version identifier with a second version identifier of the secondary boot component;

when the first version identifier and the second version identifier are equal, then complete the initialization of the boot and allow the secondary boot component to continue the boot using a non-critical boot component stored within the secondary boot component; and when the first version identifier is greater than the second version identifier, then update the secondary boot component based on information from an external source and perform a reboot of the computer.

20. A computer boot apparatus for controlling a computer boot up procedure, comprising:

a processor;

a bus;

a user interface; and a primary boot component that is fixedly mounted in the computer, and connected to the computer via the bus, the primary boot component comprising:

a firmware element that is in a non-volatile memory, comprising:

a boot critical portion comprising instructions that, when executed on the processor, initiate a boot of the computer;

a first version identifier; and a policy manager;

wherein:

the primary boot component is to initialize a boot of the computer utilizing the boot critical portion;

the policy manager is to verify and authenticate a secondary boot component that is removably attached to the computer;

the primary boot component utilizes a Serial Peripheral Interface NOR component; and the secondary boot component utilizes a Non-volatile Memory Express (NVMe) component.

21. The computer boot apparatus of claim 20, further comprising:

the secondary boot component, comprising:

a block media element that is in a non-volatile memory, comprising:

a non-boot critical portion comprising instructions that are executed after the boot critical portion instructions; and a boot critical recovery portion comprising information to update the primary boot component.

\* \* \* \* \*

UNITED STATES PATENT AND TRADEMARK OFFICE
CERTIFICATE OF CORRECTION

PATENT NO. : 10,394,654 B2
APPLICATION NO. : 15/475941
DATED : August 27, 2019
INVENTOR(S) : Ganesan et al.

Page 1 of 1

It is certified that error appears in the above-identified patent and that said Letters Patent is hereby corrected as shown below:

In the Claims

In Column 14, Line 20, in Claim 1, after "wherein", insert --:--

In Column 14, Line 34, in Claim 2, after "identifier", insert --of--

In Column 14, Line 65, in Claim 4, delete "d" and insert --and-- therefor

In Column 15, Line 61, in Claim 11, after "utilizing", insert --the--

In Column 16, Line 38, in Claim 15, delete "e" and insert --the-- therefor

In Column 16, Line 55, in Claim 16, delete "he" and insert --the-- therefor

In Column 16, Line 66, in Claim 17, after "with", insert --a--

Signed and Sealed this
Thirty-first Day of March, 2020

Andrei Iancu
*Director of the United States Patent and Trademark Office*